United States Patent
Yoshida et al.

(10) Patent No.: US 7,340,165 B2
(45) Date of Patent: Mar. 4, 2008

(54) OPTICAL AMPLIFYING DEVICE

(75) Inventors: Shoji Yoshida, Kawasaki (JP); Tooru Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/498,827

(22) Filed: Aug. 4, 2006

(65) Prior Publication Data

US 2007/0223086 A1   Sep. 27, 2007

(30) Foreign Application Priority Data

Mar. 22, 2006   (JP) ............................. 2006-079007

(51) Int. Cl.
*H04B 10/08* (2006.01)
(52) U.S. Cl. .................................. 398/37; 359/337.13
(58) Field of Classification Search ........... 359/337.13; 398/37
See application file for complete search history.

(56) References Cited

U.S. PATENT DOCUMENTS

| | | | | |
|---|---|---|---|---|
| 5,870,217 A * | 2/1999 | Itou et al. | ...................... | 398/97 |
| 5,986,782 A * | 11/1999 | Alexander et al. | ............. | 398/26 |
| 6,057,959 A * | 5/2000 | Taylor et al. | .......... | 359/337.13 |
| 6,583,909 B1 * | 6/2003 | Wada | ......................... | 398/177 |
| 6,614,589 B2 * | 9/2003 | DeGrange et al. | ....... | 359/341.4 |
| 6,906,854 B1 * | 6/2005 | Nagel et al. | ............ | 359/337.11 |
| 7,006,278 B2 * | 2/2006 | Sakamoto et al. | ........... | 359/334 |
| 7,034,993 B2 * | 4/2006 | Kajiya et al. | .......... | 359/337.13 |
| 7,075,711 B2 * | 7/2006 | Haggans et al. | ......... | 359/341.2 |
| 2002/0024723 A1 * | 2/2002 | Sekiya et al. | ............. | 359/337.1 |
| 2002/0154359 A1 * | 10/2002 | Tsuda et al. | ................. | 359/124 |
| 2002/0181045 A1 * | 12/2002 | Uda et al. | .................... | 359/124 |
| 2004/0100685 A1 * | 5/2004 | Vella et al. | ............. | 359/337.13 |

FOREIGN PATENT DOCUMENTS

| | | |
|---|---|---|
| JP | 10-336118 | 12/1998 |
| JP | 2002-368698 | 12/2002 |

* cited by examiner

*Primary Examiner*—Deandra M Hughes
(74) *Attorney, Agent, or Firm*—Staas & Halsey LLP

(57) ABSTRACT

An optical amplifying device disposed on a transmission path of a WDM signal includes an optical amplifier amplifying the WDM signal, a detecting unit detecting a change in a transmission wavelength count contained in the WDM signal and/or a change in light receiving level of the optical amplifier, a measuring unit measuring an optical signal to noise (SN) ratio of the WDM signal outputted from the optical amplifier, an update unit updating a reference value for evaluating the measurement value of the optical SN ratio obtained by the measuring unit when the detecting unit detects the change, a judging unit judging whether or not the measurement value deviates from an allowable range based on a reference value, and an output unit outputting an error of the optical amplifier if the measurement value deviates from the allowable range.

4 Claims, 6 Drawing Sheets

OPTICAL AMPLIFYING DEVICE

BACKGROUND OF THE INVENTION

1. Field of the Invention

The present invention relates to an optical amplifying device applied to a wavelength division multiplexing (WDM) communication system.

2. Description of the Related Art

Over the recent years, a transmission capacity of the WDM communication system has sharply increased and, under the actual operation, has reached such a level that signals of a terabit class per core cable (optical fiber) are transmitted.

In the WDM, the optical amplifier amplifies batchwise the signals of a plurality of channels (CH). At this time, if an optical amplification characteristic gets abnormal, all the channels are affected by this abnormality. A fault of the optical amplifier affects tremendously in proportion to the transmission capacity. It is therefore required that deterioration of the characteristic of the optical amplifier is exactly detected as soon as possible and an occurrence point of the fault be specified.

Normally, in a long distance optical transmission system, as shown in FIG. 1, a plurality of optical amplifiers is connected in series at multi-stages between a transmitting side and a receiving side (FIG. 1). Therefore, an abnormal spectrum caused by deterioration of a characteristic of a certain optical amplifier is propagated to a subsequent optical amplifier. Accordingly, even when a signal error is detected in a signal receiving unit such as a transponder on the receiving side, it is impossible to clearly judge which optical amplifier is abnormal.

In the case of an apparent failure such as a stop of the optical output due to a failure of a light-pumped laser, it is easy to notify a monitor control terminal of this abnormality by alarming. It is not, however, easy to detect the abnormality in the case of abnormality of wavelength dependency of a gain of the optical amplifier and in the case of deterioration of a noise characteristic.

An electric current and a temperature of the light-pumped laser within the optical amplifier have hitherto been monitored. Generally, the optical amplifier is, however, constructed of a plurality of light-pumped lasers, and hence it is difficult to clearly gasp a relationship between a degree of deterioration of the individual laser and an amplification characteristic of the optical amplifier.

FIG. 2 shows one example of an abnormal optical spectrum. In FIG. 2, though the electric current etc of the light-pumped laser is normal, noises excessively occur in a short wavelength are a, and the abnormality is seen in the amplification characteristic.

The following Patent document 1 and Patent document 2 are exemplified as documents of the prior art related to the present invention.

[Patent document 1] Japanese Patent Application Laid-Open Publication No. 10-336118

[Patent document 2] Japanese Patent Application Laid-Open Publication No. 2002-368698

SUMMARY OF THE INVENTION

It is an object of the present invention to provide a technology capable of properly detecting the abnormality of the optical amplifier that amplifies the WDM signal.

The present invention adopts the following means in order to accomplish the above object.

Namely, according to one embodiment of the present invention, an optical amplifying device disposed on a transmission path of a WDM signal comprises:

an optical amplifier amplifying the WDM signal;

a detecting unit detecting a change in a transmission wavelength count contained in the WDM signal and/or a change in light receiving level of the optical amplifier;

a measuring unit measuring an optical signal to noise (SN) ratio of the WDM signal outputted from the optical amplifier;

an update unit updating a reference value for evaluating the measurement value of the optical SN ratio obtained by the measuring unit when the detecting unit detects the change;

a judging unit judging whether or not the measurement value deviates from an allowable range based on a reference value; and an output unit outputting an error of the optical amplifier if the measurement value deviates from the allowable range.

When the wavelength count contained in the WDM signal and the light receiving level of the optical amplifier change, a noise characteristic of the optical amplifier changes, and an amplification characteristic of the optical amplifier might change (deteriorate). According to the present invention, the changes in the transmission wavelength count and in the light receiving level trigger updating the reference value for evaluating the optical SN ratio of the WDM signal outputted from the optical amplifier, judging whether or not the optical SN ratio deviates from the allowable range of the updated reference value, and outputting the error of the optical amplifier when deviating therefrom.

With this contrivance, it is possible to detect the error of the optical amplifier at an early stage, which is caused by the changes in the transmission wavelength count and in the light receiving level. Further, the error is outputted from the optical amplifying device including the optical amplifiers, thereby making it feasible to properly specify a position where the error occurs even in such a case that the optical amplifiers (optical amplifying device) are connected in series at multi-stages.

In the optical amplifying device according to another embodiment of the present invention, the measurement of the optical SN ratio and the judgment about the measurement value can be conducted for every transmission wavelength.

In the optical amplifying device according to still another embodiment, the judgment about the measurement value can involve using an average value of measurement values measured a plural number of times. With this contrivance, judgment accuracy can be enhanced.

In the optical amplifying device according to yet another embodiment of the present invention, the judging unit can output an error of the optical amplifier when an optical SN ratio of a wavelength in the vicinity of one unspecified transmission wavelength deviates from the allowable range. This contrivance also enables the judgment accuracy to be improved.

According to the present invention, it is possible to provide the technology capable of properly detecting the abnormality of the optical amplifier that amplifies the WDM signal.

DETAILED DESCRIPTION OF THE PREFERRED EMBODIMENT

An embodiment of the present invention will herein after be described with reference to the drawings. A configuration in the following embodiment is an exemplification, and the present invention is not limited to the configuration in the embodiment.

In the present invention, an output signal from an optical amplifier is always monitored in terms of its optical SN ratio of each channel by use of an optical signal to noise (SN) ratio monitor means such as an optical spectrum analyzer, a reference range corresponding to a state of the optical amplifier is set for each channel, and deterioration of an amplification characteristic of the optical amplifier is surely detected as soon as possible.

<Configuration of Optical Amplifying Device>

Figure 1:
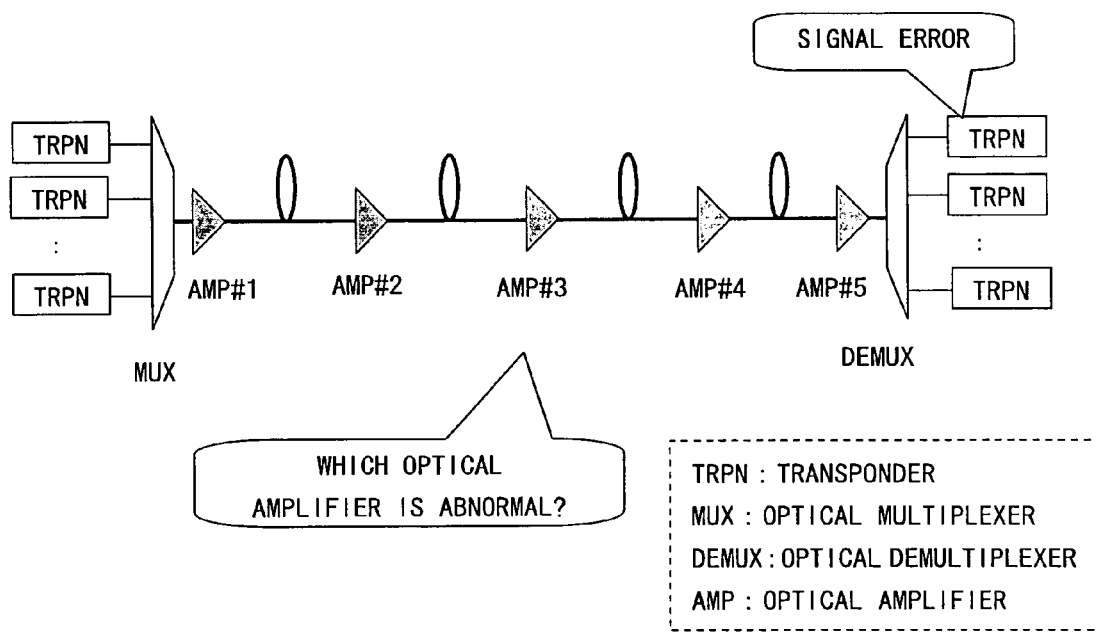
FIG. 1 is a diagram explaining an object of the present invention.
Figure 2:
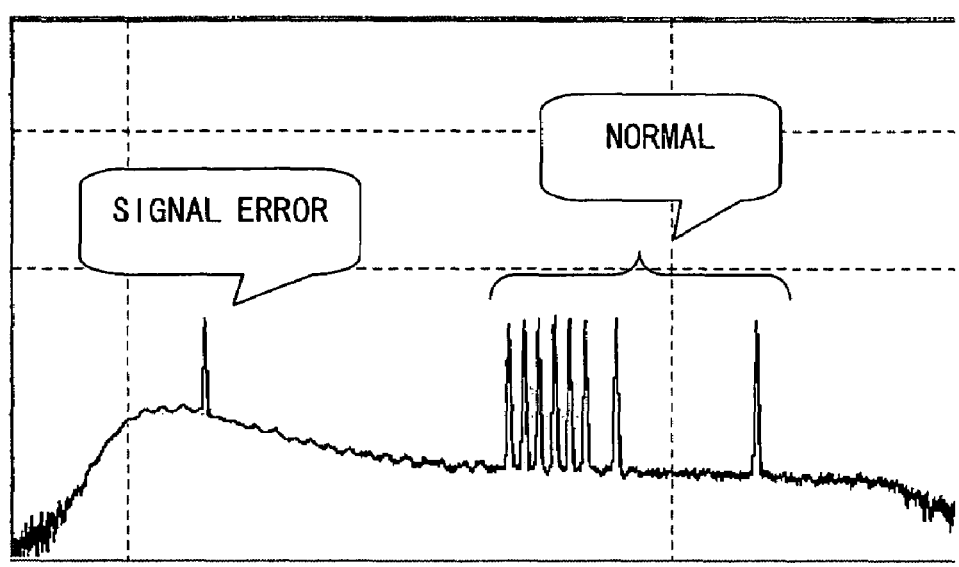
FIG. 2 is a graph showing an output spectrum of an optical amplifier in an abnormal state.
Figure 3:
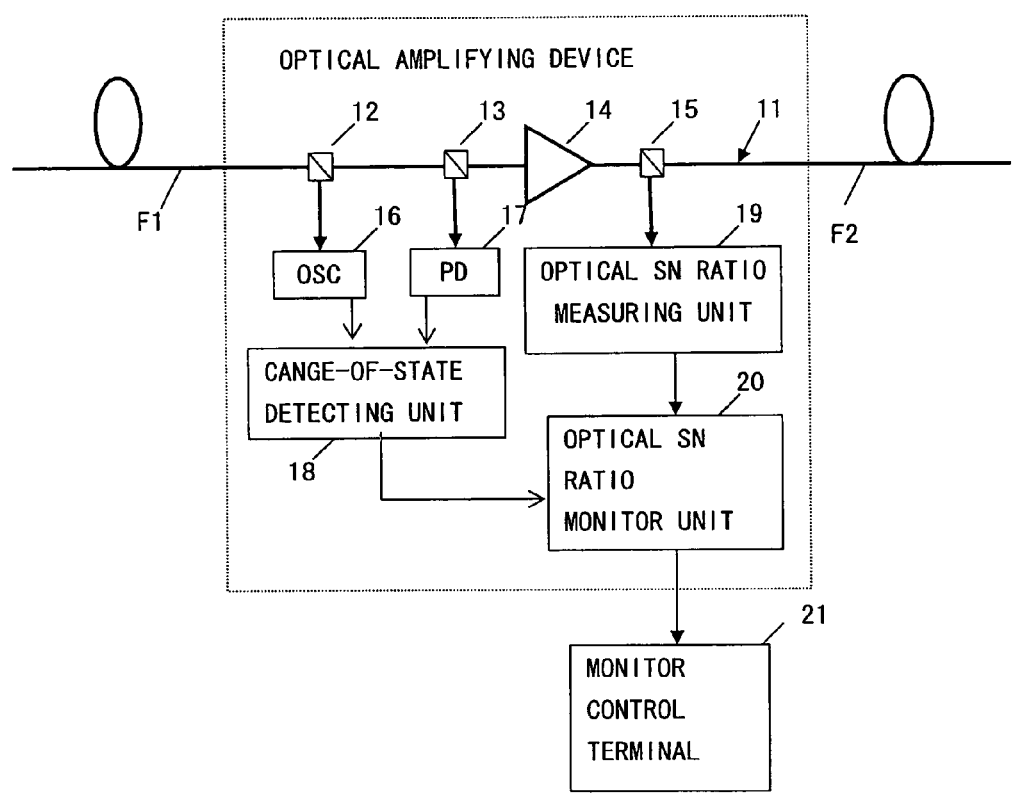
FIG. 3 is a diagram showing an example of a configuration of an optical amplifying device according to an embodiment of the present invention.

FIG. 3 is a diagram showing an example of a configuration of an optical amplifying device according to the embodiment of the present invention. An optical amplifying device 10 depicted in FIG. 3 functions as a relay device inserted in a transmission path of the optical signals in a WDM (Wavelength Division Multiplexing) network. The optical amplifying devices 10 are, as shown in FIG. 1, connected in series at multi-stages on the transmission path.

The optical amplifying device 10 is configured as follows. The optical amplifying device 10 has a relay path 11 that connects transmission paths (optical fibers) F1, F2 through which an optical main signal (WDM signal) flows, and, on this relay path 11, an optical demultiplexer 12, an optical splitter (e.g., an optical fiber coupler) 13, an optical amplifier 14 and an optical splitter 15 are disposed sequentially from an upstream side.

Further, the optical amplifying device 10 includes an OSC unit 16 connected to the optical demultiplexer 12, a photodetector (PD (Photo diode)) 17 connected to the optical splitter 13, a change-of-state detecting unit 18 connected to the OSC unit 16 and to the PD 17, an optical SN ratio measuring unit 19 connected to the optical splitter 15, and an optical SN ratio monitor unit 20 connected to the change-of-state detecting unit 18 and to the optical SN ratio measuring unit 19. The optical SN ratio monitor unit 20 is connected via the network to a monitor control terminal 21.

The optical demultiplexer 12 demultiplexes a wavelength signal (OSC signal) of an optical supervisory channel (OSC) out of the WDM signal from the transmission path F1, and inputs the OSC signal to the OSC unit 16. The OSC signal contains monitor control information such as a transmission wavelength count contained in the WDM signal. The OSC unit 16 extracts the wavelength count from the monitor control information and notifies the change-of-state detecting unit 18 of this wavelength count.

The optical splitter 13 splits the WDM signal transmitted from the optical demultiplexer 12 into two directions toward the optical amplifier 14 and toward the PD 17. The PD 17 measures a light receiving level (i.e., a light receiving level of the optical amplifier 14) of the WDM signal from the optical splitter 13, and notifies the change-of-state detecting unit 18 of this light receiving level.

The change-of-state detecting unit 18 monitors the wavelength count given from the OSC unit 16 and the reception (light receiving) level given from the PD 17 and, when the transmission wavelength count and/or the light receiving level change (or changes) notifies the optical SN ratio monitor unit 20 of the change(s) in the transmission wavelength count and/or the light receiving level as a change-of-state of the optical amplifier 14.

The optical amplifier 14 amplifies and outputs the WDM signal transmitted from the optical splitter 13. The optical splitter 15 splits the WDM signal outputted from the optical amplifier 14 in two directions toward the transmission path F2 and toward the optical SN ratio measuring unit 19. Note that such a configuration can be applied that the OSC signal containing the monitor control information generated within the optical amplifying device 10 is wavelength-multiplexed with the WDM signal transmitted toward the transmission path F2 from the optical splitter 15, and is thereafter transmitted to the transmission path F2.

The optical SN ratio measuring unit 19 is constructed of a spectrum analyzer etc. The optical SN ratio measuring unit 19 measures an optical SN ratio of each channel with respect to the optical signal that is contained in the WDM signal from the optical splitter 15, and notifies the optical SN ratio monitor unit 20 of this optical SN ratio.

The optical SN ratio monitor unit 20 has a reference value of the optical SN ratio of each channel. The optical SN ratio monitor unit 20, when receiving notification of the change of state of the optical amplifier 14 from the change-of-state detecting unit 18, updates the reference value of each channel corresponding to this state.

Herein, the optical amplifier 14 outputs optical power proportional to the wavelength count of the WDM signal. At this time, an inverted population state of an amplifying medium changes as the optical power of a light-pumped laser changes according to a target optical output value. A noise characteristic is thereby changed. Further, if the reception (light receiving) level of the WDM signal changes, an optical level diagram of an interior of the optical amplifier 14 changes in order to make constant a wavelength dependency of a gain, whereby the noise characteristic changes. In the present embodiment, if these factors for the change of the noise characteristic occur, it is judged that the state of the optical amplifier 14 changes, and the reference value of the optical SN ratio is updated for every channel.

Moreover, the optical SN ratio monitor unit 20 judges whether or not the optical SN ratio of each channel falls within a reference range (allowable range) based on the reference value by use of an evaluation value (monitor value) of the optical SN ratio of each channel that is measured by the optical SN ratio measuring unit 19. If the channel having the optical SN ratio out of the reference range is detected, the optical SN ratio monitor unit 20 notifies the monitor control terminal 21 of an alarm showing the deterioration (an error of the optical amplifier 14) of the amplification characteristic of the optical amplifier 14.

The evaluation value (monitor value) can involve applying, for example, a measurement value of the optical SN ratio of the channel, which is measured once. Alternatively, it is also possible to apply, as the evaluation value, an average value of the measurement values of the optical SN ratio, which are measured a plural number of times. Moreover, in the judgment (evaluation) as to whether the optical amplifier 14 is abnormal or not, it is feasible to take account of not only judging whether or not the evaluation value of one unspecified channel falls within the reference range but also judging about an evaluation result of a different channel (e.g., a channel in the vicinity of this unspecified channel). Namely, whether the channel is abnormal or not can be judged based on the evaluation results of the plurality of channels.

The monitor control terminal 21 can recognize from receiving the alarm from the optical amplifying device 10 that the error occurs in the optical amplifier 14. At this time, if a channel number is contained in the alarm, it is also possible to know which channel the abnormality occurs in.

Accordingly, in the case where the transmission path of the WDM signal is configured by connecting the plurality of optical amplifying devices 10 in series, the monitor control terminal 21 is so constructed as to be capable of receiving the alarm from each of the optical amplifying devices 10, thereby making it possible to know which optical amplifying device 10 (which optical amplifier 14) the alarm comes from and which channel the abnormality occurs in. The number of the monitor control terminals 21 receiving the alarm is, however, set arbitrarily.

It should be noted that the change-of-state detecting unit 18 corresponds to a detecting unit according to the present invention, the optical amplifier 14 corresponds to an optical amplifier according to the present invention, the optical SN ratio measuring unit 19 corresponds to a measuring unit according to the present invention, and the optical SN ratio monitor unit 20 corresponds to an update unit, a judging unit and an output unit according to the present invention. Functions as the update unit, the judging unit and the output unit, which are included in the optical SN ratio monitor unit 20, may be built up from two or more independent devices.

<Process in Optical Amplifying Device>

Figure 4:
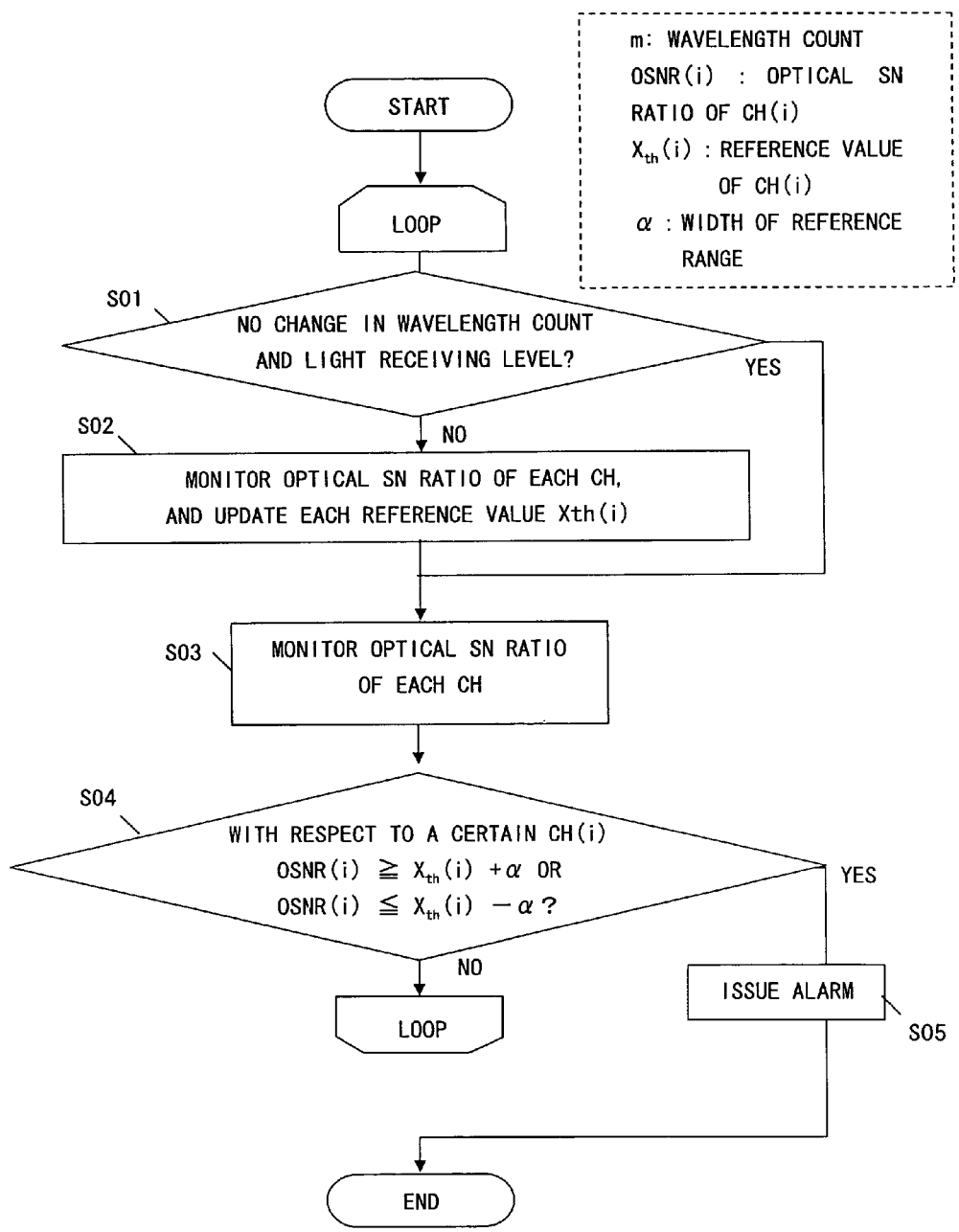
FIG. 4 is a flowchart showing a control of an optical SN ratio monitor unit shown in FIG. 3.

FIG. 4 is a flowchart showing a process (control) by the optical SN ratio monitor unit 20 in the optical amplifying device 10 shown in FIG. 3. A start of the process shown in FIG. 4 can be triggered by, e.g., starting up the optical amplifying device 10.

In FIG. 4, CH(i) represents an operation wavelength (CH(1)-CH(m): m is a wavelength count), wherein a variable "i" represents a channel number (1, 2, ..., m−1, m). A symbol "OSNR(i)" designates an optical SN ratio of CH(i), and corresponds to the evaluation value described above. A symbol "Xth(i)" denotes a reference value of CH(i), and "α" represents a width of the reference range (the allowable range with respect to the reference value)

The optical SN ratio monitor unit 20, upon starting the process, judges whether or not there is a change in the wavelength count and in the light receiving level (the change of state) (step S01). For instance, the optical SN ratio monitor unit 20 stores a storage device with the wavelength count and the light receiving level of which the optical SN ratio monitor unit 20 has been notified last time, and compares these wavelength count and light receiving level with the wavelength count and the light receiving level of which the optical SN ratio monitor unit 20 is notified this time, thereby judging whether there is the change or not.

If there is the change of state (S01; Yes), the process proceeds to step S02. Whereas if there is no change of state (S01; No), the process proceeds to step S03.

In step S02, the optical SN ratio monitor unit 20 acquires the optical SN ratio of each channel of which the optical SN ratio measuring unit 19 notifies, and updates the reference value Xth(i) of the optical SN ratio of each channel (i) corresponding to states (the wavelength count, the light receiving level and a state of the WDM signal) of the optical amplifier. At this time, a range (Xth(i)±α) centering at the reference value Xth(i) is set as the reference range.

In step S03, the optical SN ratio monitor unit 20 acquires the optical SN ratio of each channel which the optical SN ratio measuring unit 19 notifies of.

Subsequently, the optical SN ratio monitor unit 20 judges whether or not the measurement value (evaluation value) of the optical SN ratio of each channel deviates from the corresponding reference range (step S04). At this time, if none of the channels deviates from the reference range (S04; No), the process loops back to step S01, wherein a loop process of steps S01-S04 is repeatedly executed. Whereas if there is the channel deviating from the reference range (S04; Yes), the optical SN ratio monitor unit 20 judges the optical amplifier 14 to be deteriorated and sends an alarm toward the monitor control terminal 21 (step S05). The alarm can contain at least a channel number of the channel deviating from the reference range. The alarm can further contain identifying information of the optical amplifying device 10.

<Operation and Effect of Optical Amplifying Device>

According to the optical amplifying device 10, the changes in the wavelength count and in the light receiving level of the WDM signal are detected as the change of state of the optical amplifier 14, and the reference value of the optical SN ratio of each channel is updated corresponding to these changes. Thereafter, the optical SN ratio of each channel is evaluated based on the updated reference value, and, if the optical SN ratio deviates from the reference range, the alarm is outputted.

Accordingly, the deterioration of the amplification characteristic of the optical amplifier 14 due to the changes in the wavelength count and in the light receiving level can be detected as soon as possible with high accuracy. Owing to this detection, the optical amplifier 14 can be replaced before its failure, and a fault occurrence position can be easily specified when the signal error occurs.

First Modified Example

In the discussion given above, the evaluation value (monitor value) of the optical SN ratio involves using the result of the measurement of the optical SN ratio that is measured once. As a substitute for this scheme, the average value of the measurement values of the optical SN ratio, which is repeatedly measured, is employed as the evaluation value, whereby the accuracy of judging the deterioration of the optical SN ratio (amplification characteristic) can be improved.

Figure 5:
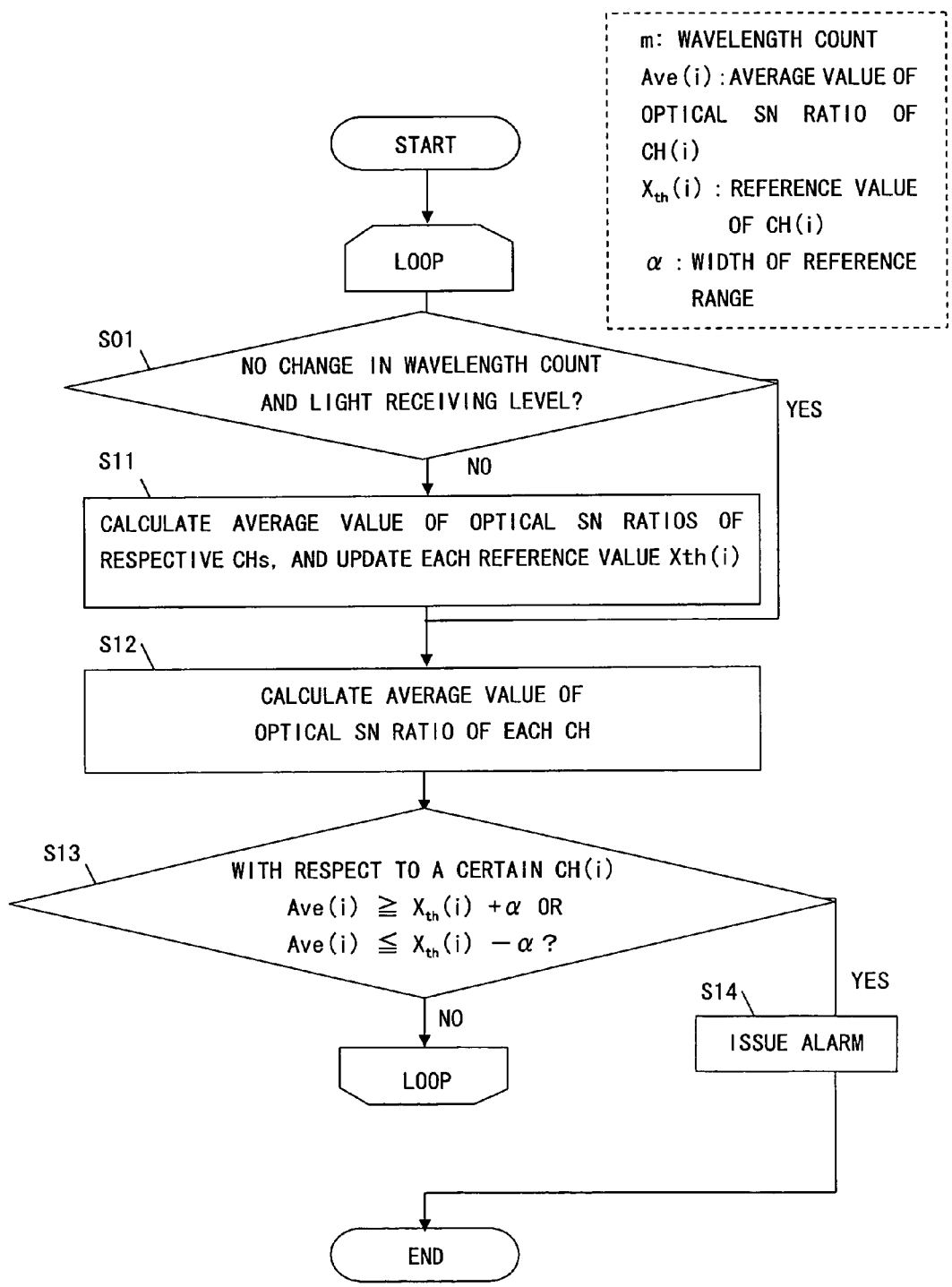
FIG. 5 is a flowchart showing a control of the optical SN ratio monitor unit according to a modified example (a case where an average value is applied)
Figure 6:
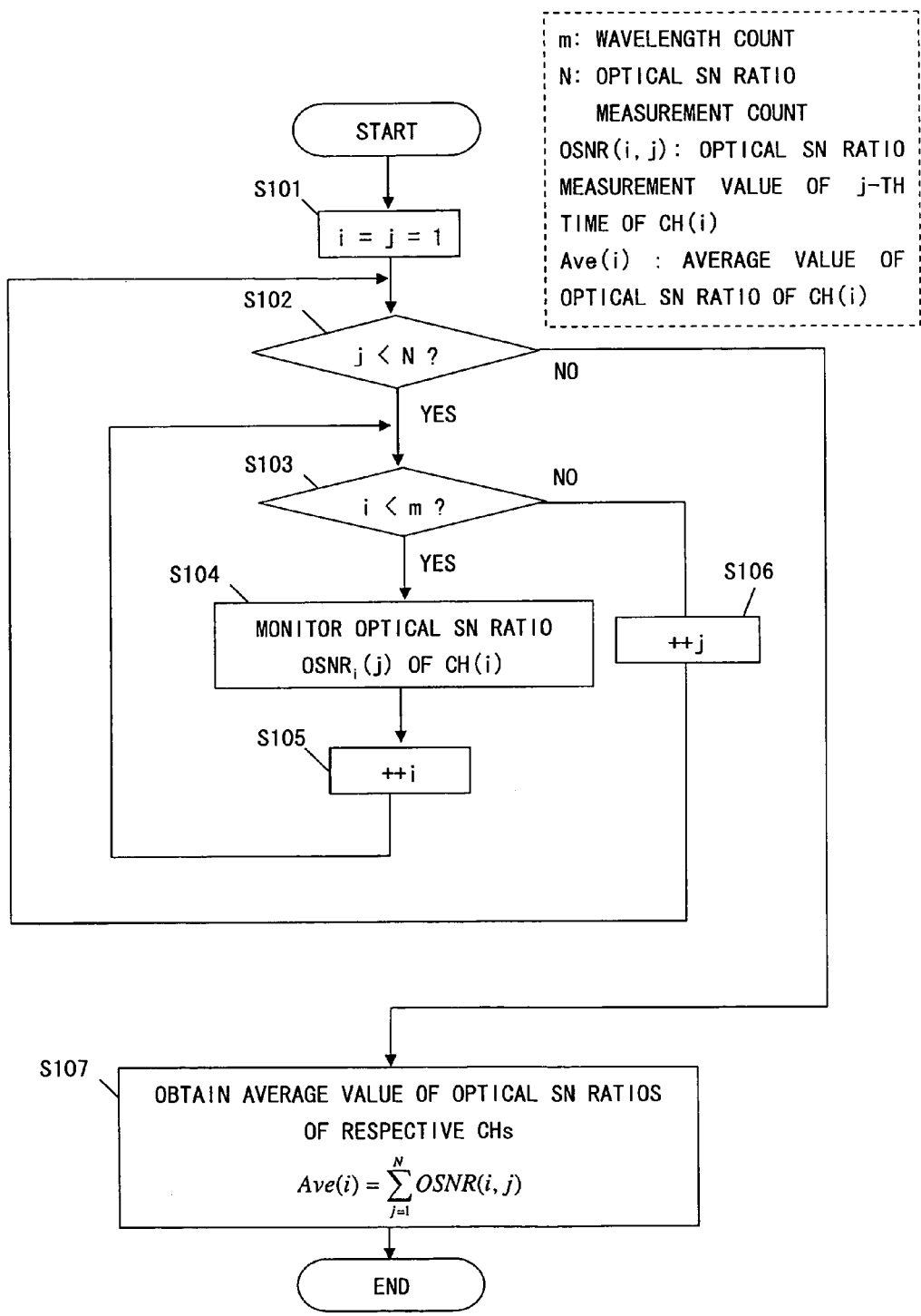
FIG. 6 is a flowchart showing an average value calculation process applied to the modified example.

FIG. 5 is a flowchart showing a process of the optical SN ratio monitor unit 20 in the case of using the average value as the evaluation value, and FIG. 6 is a flowchart showing an average value calculation process executed in steps S11 and S12 in FIG. 5.

The process shown in FIG. 5 is the same as the process shown in FIG. 4 except a point that an average value Ave(i) of the measurement values is calculated in steps S11 and S12 in place of the measurement value of the optical SN ratio that is measured once and except a point that the average value Ave (i) is applied as the evaluation value in step S13. Accordingly, the average value calculation process shown in FIG. 6 will be explained as the different point from the process shown in FIG. 4.

In FIG. 6, "N" represents a measurement count (e.g., approximately 10 through 20 times) of the optical SN ratio that is sufficient for calculating the average value. Further, "OSNR(i,j)" represents a measurement value of the optical SN ratio of j-th time. When the average value process is started, the optical SN ratio monitor unit 20 sets values of the variables i and j (step S101).

Next, the optical SN ratio monitor unit 20 judges whether or not the value of the variable j is smaller than N (step S102) Namely, it is judged whether or not the value of the variable j (measurement count) reaches the predetermined measurement count N suited for obtaining the average value. The process proceeds to step S103 if the value of the variable j is smaller than N (S102; Yes) and proceeds to step S107 where as if not (S102; No).

In step S103, the optical SN ratio monitor unit 20 judges whether or not a value of the variable i (channel number) is smaller than the wavelength count m. At this time, the process proceeds to step S104 if the variable i is smaller than the wavelength count m (S103; Yes) and proceeds to step S106 where as if not (S103; No).

In step S104, the optical SN ratio monitor unit 20 monitors an optical SN ratio OSNRi(j) of the channel CH(i) corresponding to the value of the variable i at the present. Namely, the optical SN ratio monitor unit 20 obtains the measurement value of the optical SN ratio of the channel CH(i) from the optical SN ratio measuring unit 19. Thereafter, the optical SN ratio monitor unit 20 adds "1" to the value of the variable i (step S105), and returns the process to step S103.

Through the loop process of steps S103-S105, the optical SN ratios of the channels CH(i)-CH(m) are obtained. Thereafter, when judging in step S103 that the value of the variable i reaches the wavelength count m (S103; Yes), the optical SN ratio monitor unit 20 adds "1" to the value of the variable j (step S106), and returns the process to step S102.

Thus, the optical SN ratio monitor unit 20 repeats the loop process of steps S102 through S106 till the measurement count of the optical SN ratios of the channels CH(i)-CHr(m) reaches "N". Thereafter, when the measurement count reaches "N" (S102; No), the optical SN ratio monitor unit 20 obtains the average value Ave(i) of the optical SN ratios of the respective channels.

Thereafter, in step S13 shown in FIG. 5, it is judged based on the average value Ave(i) as the evaluation value whether the optical SN ratio deviates from the reference range or not, and, if deviating from the reference range, the alarm is outputted (step S05).

Further, in step S11, in the average value calculation process, if the change of state (the changes in the wavelength count and in the light receiving level) of the optical amplifier 14 occurs, in the same way as in the process shown in FIG. 4, the reference value Xth(i) is updated. The optical SN ratio monitor unit 20 can apply the reference value Xth(i) at the present (which is set last time) to the judgment in step S13. Further, the optical SN ratio monitor unit 20 can also apply an average value of the reference values Xth(i) set in the average value calculation process in step S11 to the judgment in step S13.

According to the first modified example explained above, the average value of the optical SN ratios is applied as the evaluation value (monitor value). The sufficient accuracy can not be obtained from one measurement depending on the precision of the monitor means (the optical SN measuring unit 19) of the optical SN ratio, and there is a possibility that the alarm based on misjudgment might be outputted. The judgment accuracy can be enhanced by applying the average value.

Second Modified Example

A second modified example is that the processes in step S04 and in step S13 can be modified so as to judge that the abnormality (error) occurs, from a criterion that the evaluation value (monitor value) of the optical SN ratio of channel (s) (one or more channels in the vicinity of an unspecified channel) different from this unspecified channel, deviates from the reference range. The change in the gain characteristic of the optical amplifier 14 extends not only to the specified wavelength (channel) but also to the wavelengths (channels) in the vicinity thereof. An alarm derived from abnormality of a transponder as a single unit can be prevented from being issued (see FIG. 1) by making the judgment in such a mode, thereby enabling more proper judgment about the abnormality of the optical amplifier 14.

The channel (s) (vicinal channel (s)) different from the unspecified channel can be arbitrarily set beforehand. In the case of judging that the evaluation value (monitor value) of the vicinal channel deviates from the reference range, it is an arbitrary option to take the criterion that the evaluation value of the unspecified channel deviates from the reference range, as a condition for judging the abnormality of the optical amplifier 14.

[Others]

The disclosures of Japanese patent application No. JP2006-079007 filed on Mar. 22, 2006 including the specification, drawings and abstract are incorporated herein by reference.

What is claimed is:

1. An optical amplifying device disposed on a transmission path of a wavelength division multiplexing (WDM) signal, comprising:
    an optical amplifier amplifying a WDM signal;
    a detecting unit detecting a change in a transmission wavelength count contained in the WDM signal and/or a change in light receiving level of the WDM signal received from a transmission path and inputted to said optical amplifier;
    a measuring unit measuring an optical signal to noise ratio of the WDM signal outputted from said optical amplifier;
    an update unit updating a reference value for evaluating the measurement value of the optical signal to noise ratio obtained by said measuring unit when said detecting unit detects the change;
    a judging unit judging whether or not the measurement value deviates from an allowable range based on a reference value; and
    an output unit outputting an error of said optical amplifier if the measurement value deviates from the allowable range.

2. An optical amplifying device according to claim 1, wherein the measurement of the optical signal to noise ratio and the judgment about the measurement value are conducted for every transmission wavelength.

3. An optical amplifying device according to claim 1 or 2, wherein the judgment about the measurement value involves using an average value of measurement values measured a plural number of times.

4. An optical amplifying device according to claim 1 or 2, wherein said judging unit outputs an error of said optical amplifier when an optical signal to noise ratio of a wavelength in the vicinity of one unspecified transmission wavelength deviates from the allowable range.

* * * * *